United States Patent
Grumstrup et al.

(10) Patent No.: US 6,186,167 B1
(45) Date of Patent: Feb. 13, 2001

(54) EMERGENCY SHUTDOWN TEST SYSTEM

(75) Inventors: Bruce F. Grumstrup; Stephen G. Seberger, both of Marshalltown, IA (US)

(73) Assignee: Fisher Controls International Inc., Clayton, MI (US)

( * ) Notice: Under 35 U.S.C. 154(b), the term of this patent shall be extended for 0 days.

(21) Appl. No.: 09/262,444

(22) Filed: Mar. 4, 1999

(51) Int. Cl.[7] .................................................. F16K 31/124
(52) U.S. Cl. ........................................ 137/487.5; 137/456
(58) Field of Search ................................... 137/456, 451, 137/487.5; 251/26, 30.01; 73/168

(56) References Cited

U.S. PATENT DOCUMENTS

| | | |
|---|---|---|
| 2,466,375 | 4/1949 | Carbon . |
| 3,665,945 | 5/1972 | Ottenstein . |
| 3,952,759 | 4/1976 | Ottenstein . |
| 4,174,729 | 11/1979 | Roark et al. . |
| 4,911,192 | 3/1990 | Harfiel et al. . |
| 5,197,328 | 3/1993 | Fitzgerald . |
| 5,198,973 * | 3/1993 | Steutermann ............... 364/167.01 |
| 5,431,182 * | 7/1995 | Brown ........................... 137/487.5 |
| 5,434,774 * | 7/1995 | Seberger ........................ 364/172 |
| 5,651,385 | 7/1997 | Karte . |
| 5,654,885 | 8/1997 | Mayhew et al. . |
| 5,665,898 | 9/1997 | Smith et al. . |
| 5,684,451 * | 11/1997 | Seberger et al. .................. 137/487.5 |

OTHER PUBLICATIONS

Patent Abstract of Japan vol. 1996, No. 11, 29 Nov. 1996 (1996–11/29).
Applicant–FUJI ELECTRIC CO LTD; inventor–Tanakura Nobuyuki; Title–Stem Free Testing Device Of Main Steam Stop Valve.

\* cited by examiner

*Primary Examiner*—Gregory L. Huson
*Assistant Examiner*—Ramesh Krishnamurthy
(74) *Attorney, Agent, or Firm*—Marshall, O'Toole, Gerstein, Murray & Borun

(57) ABSTRACT

An emergency shutdown system for a process control system includes an emergency shutdown (ESD) valve and an associated valve actuator. An emergency shutdown (ESD) controller provides output signals to the ESD valve in the event of a failure in the process control system. A solenoid valve responds to the ESD controller to vent the actuator to a fail state. A digital valve controller (DVC) test strokes the ESD valve. An impedance booster device enables the dc powering of the solenoid valve and the DVC over a two wire line while still permitting digital communication over the same two wire line.

11 Claims, 1 Drawing Sheet

EMERGENCY SHUTDOWN TEST SYSTEM

This invention relates to emergency shutdown systems used in process control systems and to the testing of emergency shutdown valves used in such systems.

BACKGROUND OF THE INVENTION

Process control systems incorporate emergency shutdown valves which are normally in a fully opened or fully closed state. In order to assure that such emergency shutdown valves can properly function, they are periodically tested by partially opening or closing these valves. Since these tests are typically performed with pressure in the pipeline of the process control system, it is important to perform any test quickly and then return the valve to its normal state.

In such prior emergency shutdown systems, in order to perform a short test, a complicated panel of pneumatic valves and switches are normally used by an operator to partially open or close the emergency shutdown valve under test. In particular, this requires an operator to observe and understand a panel of pneumatic valves and switches and then to operate the particular associated valves and switches in order to partially open or close the desired emergency shutdown valve being tested. It is also important that any emergency shutdown system provide the ability to be able to move the emergency shutdown valve to its safe condition when commanded by the emergency shutdown controller, in the unlikely, but possible situation where a failure event has occurred during a valve test interval, and the valve under test must now be properly commanded by the emergency shutdown system.

SUMMARY OF THE INVENTION

In accordance with the principles of the present invention, there is provided an emergency shutdown system which includes an emergency shutdown controller for commanding the operation of an emergency shutdown valve between a normally fully opened or fully closed state to an emergency state when a failure event is detected in the process control system. The emergency shutdown system includes a solenoid valve coupled to the emergency shutdown controller for responding to the controller and venting the emergency shutdown valve actuator to a fail state. A digital valve controller or positioner includes an output pressure coupled through the solenoid valve to the valve actuator of the emergency shutdown valve so that the emergency shutdown valve can be quickly ramped up and down in order to test the emergency shutdown valve. As an example, a digital signal sent to the digital valve controller moves the emergency shutdown valve from its normal fully opened or fully closed state to a partially opened or partially closed state, and then quickly returns the valve to its normal state. If an emergency occurs during the test procedure or at any other time, the emergency shutdown system acts through the emergency shutdown controller to de-energize the solenoid valve, causing the solenoid valve to vent the emergency shutdown valve actuator to a fail state.

In a preferred embodiment of the invention, the powering of the solenoid valve and of the digital valve controller is provided by the emergency shutdown controller on the same pair of wires. Also, it is preferred that a digital communicating device, such as a hand held digital unit is coupled to the digital valve controller to provide the required digital signals for moving the emergency shutdown valve during the test procedure. The digital communicator can be coupled to the same pair of wires powering both the solenoid valve and the digital valve controller with the use of an impedance boosting device inserted on the pair of wires between the emergency shutdown controller and the digital units. The impedance boosting device enables dc power such as 24 volts dc to be supplied to power the solenoid valve and the digital valve controller on the same pair of wires, while also permitting the digital communicator to reliably communicate with the digital valve controller over the same pair of wires.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
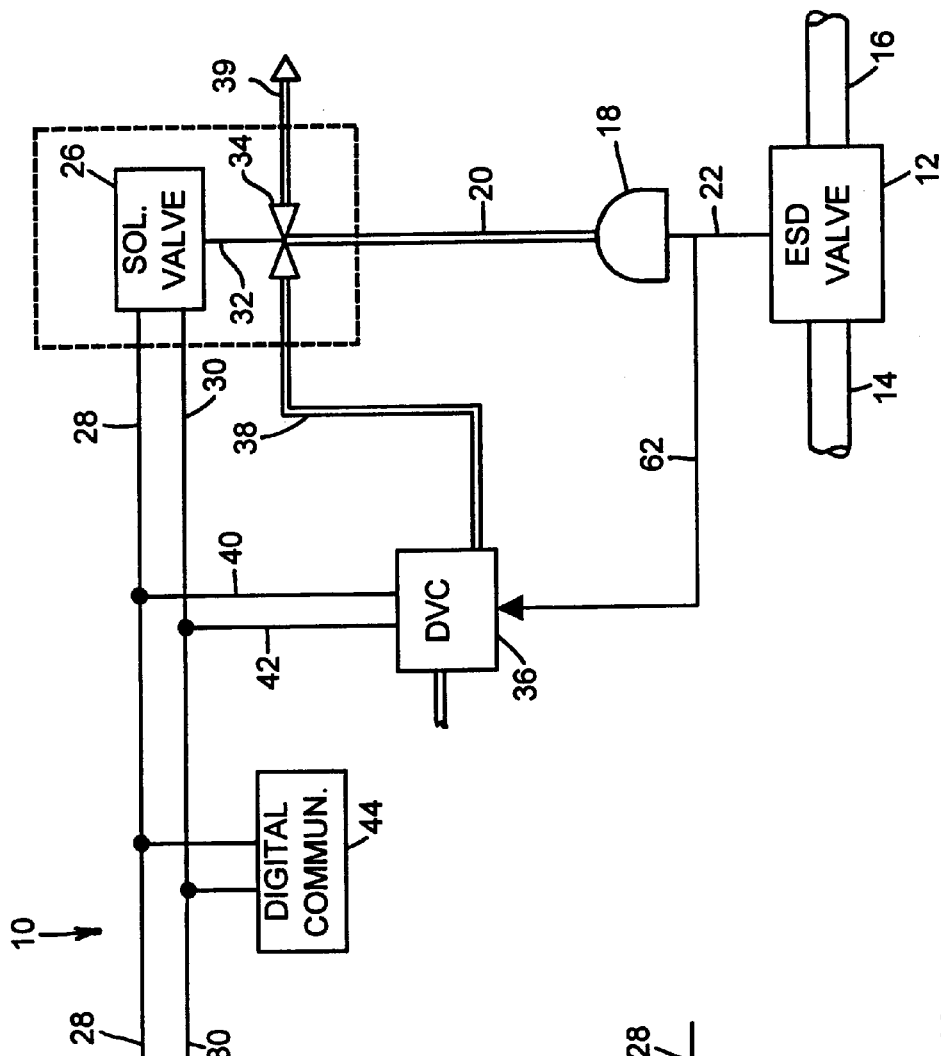
FIG. 1 is a schematic diagram illustrating a system for testing emergency shutdown fluid control valves.
Figure 2:
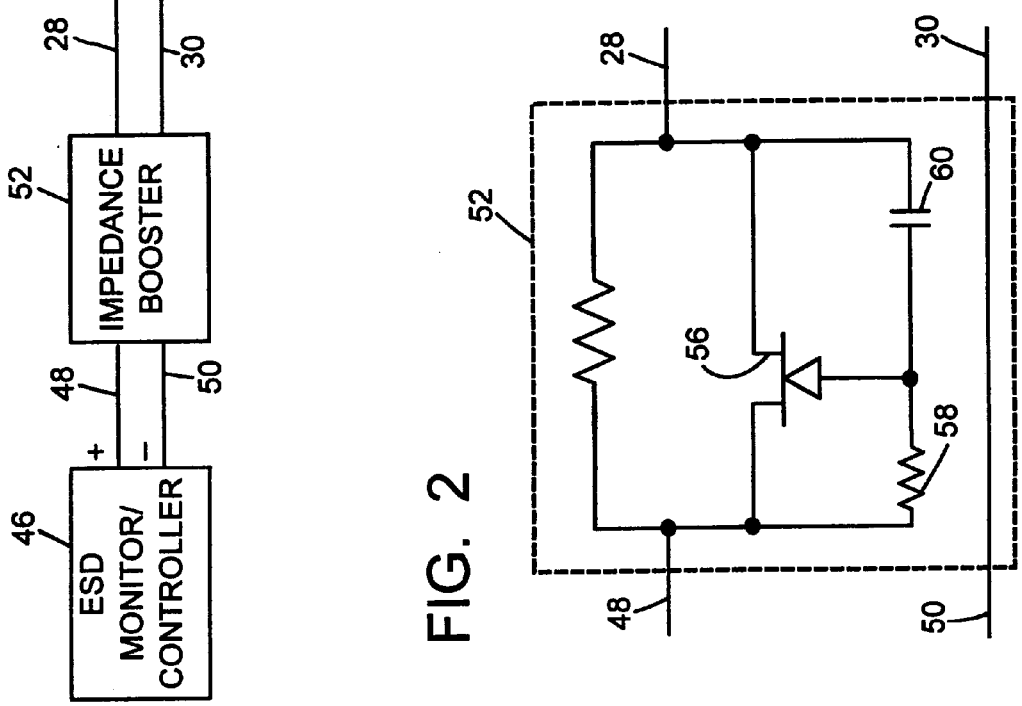
FIG. 2 is a schematic diagram illustrating a impedance boosting device useful in the system of FIG. 1.

FIG. 1 illustrates an emergency shutdown test system 10 for testing an emergency shutdown valve 12. The emergency shutdown valve 12 may be located for instance in a process control system including a pipeline 14 supplying fluid at the inlet to valve 12 and outlet pipeline 16 leading fluid from the outlet of valve 12.

The emergency shutdown valve 12 is normally in a wide open state permitting fluid to flow freely between pipeline 14 and pipeline 16 or in a fully closed state preventing any fluid communication between pipeline 14 and pipeline 16. In order to ensure that the emergency shutdown valve 12 will properly function when desired in a true emergency condition, the valve 12 must be periodically tested by partially opening or closing the emergency shutdown valve. The emergency shutdown test system 10 includes means for periodically testing the operation of the valve 12 with pressure in the pipelines 14, 16, and to perform the testing of the valve 12 quickly and then returning the valve to its normal state. Means are also provided in the emergency shutdown test system 10 to move the emergency shutdown valve 12 to its safe condition in the event an actual emergency condition exists during the periodic testing of the valve 12.

A valve actuator 18 includes a pneumatic input coupled to a pneumatic line 20 and an actuator output line 22 providing the actuator output to move the valve 12 in response to the pneumatic pressure in pneumatic line 20. A solenoid valve 24 includes a solenoid control portion 26 receiving dc power and electrical control signals on a two wire line 28, 30. The control portion 26 provides an output on line 32 coupled to a solenoid valve portion 34 to control the flow of pneumatic pressure through the solenoid valve portion 34.

A digital valve controller 36 is mounted to the emergency shutdown valve 12 and includes a pneumatic output line 38 coupled to the solenoid valve portion 34. Thus, depending on the signal on control output line 32 from the solenoid control portion 26, the pneumatic pressure on line 38 from the digital valve controller 36 can be either directed to the pneumatic line 20 and then to valve actuator 18, or to an exhaust line 39. The digital valve controller 36 also includes electrical lines 40, 42 connected respectively to the two wire lines 28, 30. A digital communications device such as a handheld unit 44 or a personal computer is coupled to the two wire line 28, 30 for supplying digital control signals to the digital valve controller 36 during periodic testing of the emergency shutdown valve 12.

The emergency shutdown test system 10 includes a monitor system including an emergency shutdown controller 46 having a two wire line 48, 50 coupled respectively to the two wire line 28, 30 via a impedance boosting device 52. The emergency shutdown controller 46 provides dc power, such as 24 volts dc, to the two wire line 48, 50 and to the two wire line 28, 30 and eventually to the solenoid valve control portion 26 to enable the proper operation of the valve 12 as will be described in more detail hereinafter.

The impedance boosting device 52 enables dc power from the emergency shut down controller 46 to be supplied to power the solenoid valve 24 and the digital valve controller 36 on the same pair of wires 28, 30, with minimal power loss, while also permitting the digital communicator 44 to reliably communicate with the digital valve controller 36. The impedance boosting device 52 provides efficient high ac impedance isolation of the emergency shutdown controller 46 from the digital communication units 44 and 36 while still enabling a low dc impedance level to the dc power which must be supplied from the controller 46 to the controller 36 and the solenoid valve 24.

In particular, a field effect transistor 56 is biased by resistor 58 to conduct sufficient dc power to operate the digital valve controller 36 and solenoid 24 while at the same time capacitor 60 holds the gate voltage of transistor 56 relatively constant such that the ac impedance on two wire lines 28, 30 is high enough to facilitate digital communication between device 44 and the digital valve controller 36.

The operation of the emergency shutdown system 10 may now be described as follows. During normal operation of the emergency shut down monitoring system, the emergency shut down controller 46 supplies 24 volts dc which is coupled on two wire lines 48, 50 to the impedance boosting device 52 and with minimal loss the 24 volts dc is coupled to two wire lines 28, 30 to power the solenoid valve 24. The solenoid valve 24 is thereby maintained in a normal state to provide fluid communication between pneumatic lines 38 and 20. The digital valve controller is also coupled to wires 28, 30 by means of lines 40, 42 which provides power to the digital valve controller. The digital valve controller 36 receives a pressure supply and senses a valve stem position through the linkage 62. The digital valve controller compares a digital set point which is internal to the digital valve controller to the valve stem position to maintain the desired emergency shutdown valve position during normal operation.

When it is desired to periodically perform a short test on the emergency shut down valve 12, digital command signals from the communication device 44, to the digital valve controller 36 over the two wire line 28, 30, command the digital valve controller 36 to control the pneumatic output on line 38 coupled to the valve actuator 18 to ramp the valve 12 from the normal 100 percent open condition to a partially opened condition and then back again to the normally 100 percent open condition. It is to be appreciated that the ramp testing of emergency shutdown valve 12 is accomplished on the same two wire line 28, 30 which supplies the operating power from the controller 46 to the solenoid valve 24 for placing the valve 12 in the desired position.

If a true emergency occurs during the valve ramp test sequence or at another time, the emergency shut down controller 46 will remove the 24 volts dc power source from the two wire lines 28, 30 and 40, 42. Removal of the power source from the solenoid valve 24 causes the solenoid valve to vent the valve actuator 18 to the exhaust line 39 so as to vent the actuator to a fail state, and thereby place the valve 12 in the desired emergency shut down position. This also removes power from the digital valve controller which causes it to vent pressure in line 38, thereby providing a redundant method in moving the valve 12 to the desired emergency shutdown position.

Rather than the field effect transistor 56 utilized in the impedance boosting device 52, other devices may be utilized in accordance with the teachings herein. For example, a suitable inductor and resistor in parallel may be utilized if desired. The purpose of the impedance boosting device 52 is to enable passage of the 24 volts dc power source from the controller 46 on the two wire line 28, 30 to power the solenoid valve 24 as well as the digital valve controller 36, while also enabling the digital communication of the communicating device 44 and the digital valve controller 36 with the same two wire line 28, 30 during periodic testing and other diagnostic procedures conducted with valve 12. Accordingly, other devices can be utilized with the teaching herein to pass the 24 volts dc power source from the controller 46 to the two wire line 28, 30 while blocking passage of the digital signals from the two wire line to the controller 46.

In utilizing the present invention the operator could visually observe movement of the emergency shutdown valve during testing if the operator is in viewing distance of the valve. On the other hand, the operator could transmit commands from a remote location with a personal computer acting as the digital communicator 44. The digital valve controller 36 then could provide diagnostic information to indicate how well the emergency shutdown valve performed during the test.

The foregoing detailed description has been given for clearance of understanding only, and no unnecessary limitations should be understood therefrom, as modifications will be obvious to those skilled in the art.

What is claimed is:

1. An emergency shutdown system for a process control system comprising:

an emergency shutdown valve and associated valve actuator located within a desired portion of the process control system;

an emergency shutdown controller providing output signals for commanding the operation of the shutdown valve in response to sensing of a failure event in the process control system;

a solenoid valve coupled to the shutdown valve actuator and responsive to the shutdown controller output signals for venting the actuator to a fail state; and digital valve controller means for testing the operability of the emergency shutdown valve, including a pressure output coupled to the shutdown valve actuator for ramping said shutdown valve from a normal position to a test position and returning to the normal position, wherein the normal position includes one of a fully opened normal position and a fully closed normal position, and wherein the test position includes one of a partially opened test position and a partially closed test position.

2. An emergency shutdown system according to claim 1, including means for powering the solenoid valve and the digital valve controller means from the emergency shutdown controller.

3. An emergency shutdown system according to claim 2, including a two-wire line connected at one end to the emergency shutdown controller, and at the opposite end to the solenoid valve and the digital valve controller means, the solenoid valve and the digital valve controller means being coupled in parallel across the two-wire line.

4. An emergency shutdown system according to claim 3, including an impedance booster in the two-wire line between the emergency shutdown controller at one line end and the digital valve controller means at the opposite line end to enable the powering of the solenoid valve and the digital valve controller means, the impedance booster further enabling digital communication over the two-wire line.

5. An emergency shutdown system according to claim 1, wherein the valve actuator is adapted for opening the valve to a range of positions from fully closed to fully opened.

6. An emergency shutdown system according to claim 4, including a digital communications device coupled to the two-wire line, wherein the digital communications device is adapted to supply digital control signals to the digital valve controller means during periodic testing of the emergency shutdown valve.

7. An emergency shutdown system according to claim 6, wherein the digital communications device is coupled between the impedance booster and the solenoid valve.

8. An emergency shutdown system for a process control system comprising:

an emergency shutdown valve and associated valve actuator located within a desired portion of the process control system;

an emergency shutdown controller providing output signals for commanding the operation of the shutdown valve in response to sensing of a failure event in the process control system;

a solenoid valve coupled to the shutdown valve actuator and responsive to the shutdown controller output signals for venting the actuator to a fail state;

digital valve controller means for testing the operability of the emergency shutdown valve, the digital valve controller means including a pressure output coupled to the shutdown valve actuator for ramping the shutdown valve from a normal position to a test position and returning to the normal position;

a two-wire line connected at one end to the emergency shutdown controller, and at the opposite end to the solenoid valve and the digital valve controller means, the solenoid valve and the digital valve controller means being coupled in parallel across the two-wire line; and a digital communications device coupled to the two-wire line, wherein the digital valve controller means is adapted to receive digital control signals from the digital communications device, and responsively ramp the shutdown valve from the normal position to the test position and return to the normal position.

9. An emergency shutdown system according to claim 8, wherein the normal position includes one of a fully opened normal position and a fully closed normal position, and wherein the test position includes one of a partially opened test position and a partially closed test position.

10. An emergency shutdown system according to claim 8, including an impedance booster in the two-wire line between the emergency shutdown controller at one line end and the digital valve controller means at the opposite line end, the impedance booster adapted to enable the powering of the solenoid valve and the digital valve controller means, and the impedance booster further adapted to enable digital communication between the digital communications device and the digital valve controller means over the two-wire line.

11. An emergency shutdown system according to claim 10, wherein the digital communications device is coupled between the impedance booster and the solenoid valve.

* * * * *

UNITED STATES PATENT AND TRADEMARK OFFICE
Certificate

Patent No. 6,186,167                                                        Patented: February 13, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Bruce F. Grumstrup, Marshalltown, IA (US); Stephen G. Seberger, Marshalltown, IA (US); and Patrick S. Flanders, Dhahran, Saudi Arabia.

Signed and Sealed this Twentieth Day of June 2006.

ERIC KEASEL
*Supervisory Patent Examiner*
Art Unit 3753